United States Patent
Xue et al.

(10) Patent No.: US 11,538,471 B2
(45) Date of Patent: Dec. 27, 2022

(54) METHOD AND APPARATUS FOR AUDIO DATA PROCESSING

(71) Applicant: ALIBABA GROUP HOLDING LIMITED, George Town (KY)

(72) Inventors: Shaofei Xue, Hangzhou (CN); Biao Tian, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/264,518

(22) Filed: Jan. 31, 2019

(65) Prior Publication Data

US 2019/0237065 A1    Aug. 1, 2019

(30) Foreign Application Priority Data

Jan. 31, 2018   (CN) .......................... 201810093648.6

(51) Int. Cl.
| | | |
|---|---|---|
| *G10L 15/20* | (2006.01) | |
| *G10L 21/0232* | (2013.01) | |
| *H04S 7/00* | (2006.01) | |
| *G10L 21/00* | (2013.01) | |
| *G10L 21/0208* | (2013.01) | |

(Continued)

(52) U.S. Cl.
CPC ............. *G10L 15/20* (2013.01); *G10L 15/22* (2013.01); *G10L 21/00* (2013.01); *G10L 21/0232* (2013.01); *G10L 25/84* (2013.01); *H04S 7/305* (2013.01); *G10L 25/03* (2013.01); *G10L 2021/02082* (2013.01)

(58) Field of Classification Search
CPC ......... G10L 15/20; G10L 15/22; G10L 21/00; G10L 21/0232; G10L 25/84; G10L 25/03; G10L 2021/02082; H04S 7/305

USPC ......................................................... 704/233
See application file for complete search history.

(56) References Cited

U.S. PATENT DOCUMENTS 5,511,129 A  *  4/1996  Craven  ................. H03G 5/165
                                                   381/103
6,782,105 B1 *  8/2004  Sahara  .................. G10K 15/12
                                                   381/61

(Continued)

FOREIGN PATENT DOCUMENTS

CN       105427860 A       3/2016
CN       106328126 A       1/2017
(Continued)

OTHER PUBLICATIONS

PCT Notification of Transmittal of the International Search Report and the Written Opinion of the International Searching Authority, or the Declaration issued in related International Application No. PCT/US2019/016145, dated Apr. 29, 2019 (12 pgs.).

(Continued)

*Primary Examiner* — Pierre Louis Desir
*Assistant Examiner* — Nicole A K Schmieder
(74) *Attorney, Agent, or Firm* — Finnegan, Henderson, Farabow, Garrett & Dunner, LLP

(57) ABSTRACT

Embodiments of the disclosure provide methods and apparatuses processing audio data. The method can include: acquiring audio data by an audio capturing device, determining feature information of an enclosure in which the audio capturing device is located, and reverberating the feature information into the audio data.

14 Claims, 3 Drawing Sheets

(51) Int. Cl.
*G10L 25/03* (2013.01)
*G10L 25/84* (2013.01)
*G10L 15/22* (2006.01)

(56) References Cited

U.S. PATENT DOCUMENTS

2009/0010460 A1  1/2009  Diedrichsen
2012/0093330 A1  4/2012  Napoletano
2012/0275613 A1  11/2012  Soulodre
2015/0334505 A1* 11/2015  Crutchfield ........... G06F 3/0482
                                              381/17
2016/0314782 A1  10/2016  Klimanls

FOREIGN PATENT DOCUMENTS

CN    107452372 A    12/2017
CN    107481731 A    12/2017
EP    0 898 364 A2    4/1998

OTHER PUBLICATIONS

The first Office Action and a Search Report issued by Chinese Patent Office in corresponding with a Chinese Application No. 201810093648.6, dated Sep. 26, 2022. (7 pages of the Office Action and 3 pages of the Search Report).

* cited by examiner

METHOD AND APPARATUS FOR AUDIO DATA PROCESSING

CROSS REFERENCE TO RELATED APPLICATION

The disclosure claims the benefits of priority to Chinese Application Number 201810093648.6, filed Jan. 31, 2018, which is incorporated herein by reference in its entirety.

BACKGROUND

In recent years, speech recognition technology has made significant progress and has gradually moved from the laboratory to the market. Voice recognition technology has been widely used in many fields such as industry, home appliances, communications, automotive electronics, medical care, home services, and consumer electronics. The technical fields involved in speech recognition technology are complex, including signal processing, pattern recognition, probability theory and information theory, vocal mechanism and auditory mechanism, artificial intelligence and so on.

Far-field speech recognition technology is an important technology in the field of speech recognition. The purpose is to enable the machine to recognize human speech under long-distance conditions (usually 1 m-5 m). Far-field speech recognition technology has important applications in smart homes (such as smart speakers, smart TVs, etc.) and conference transcription.

But due to the large amount of noise, multipath reflection, and reverberation in the environment, the quality of the picked-up speech signal can be low. Therefore, the accuracy of far-field speech recognition is generally significantly lower than that of near-field speech recognition. Based on this, in far-field speech recognition, a large amount of far-field speech data can be used for model training to improve the accuracy of speech recognition.

In the process of model training for far field speech recognition, voice data is usually collected by means of a microphone array. However, due to factors such as equipment and venue, recording far-field voice data is more expensive than recording near-field voice data, and a large amount of real far-field voice data is usually not easily available. Therefore, in conventional systems, in the process of model training for far field speech recognition, near field speech data can be simulated to generate far field speech data. The purpose of generating far-field speech data by using near-field speech data is to make the far-field speech data generated by the simulation close to the real far-field speech data, so as to better perform model training. But the generated far-field speech models trained by conventional systems can deviate widely from the actual speech.

SUMMARY OF THE DISCLOSURE

The embodiments of the present disclosure relate to the field of audio recognition technologies such as speech data processing. The embodiments include a method for processing audio data. The method includes acquiring audio data by an audio capturing device; determining feature information of an enclosure in which the audio capturing device is placed; and reverberating the feature information into the audio data.

The embodiments also include a non-transitory computer-readable medium having stored therein a set of instructions that are executable by at least on processor of a computer system to cause the computer system to perform a method for processing audio data. The method includes acquiring audio data by an audio capturing device; determining feature information of an enclosure in which the audio capturing device is placed; and reverberating the feature information into the audio data.

The embodiments also include a device for processing audio data. The device includes a memory for storing a set of instructions and at least one processor configured to execute the set of instructions. The execution of the set of instructions can cause the device to acquire audio data by an audio capturing device; determine feature information of an enclosure in which the audio capturing device is placed; and reverberate the feature information into the audio data.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
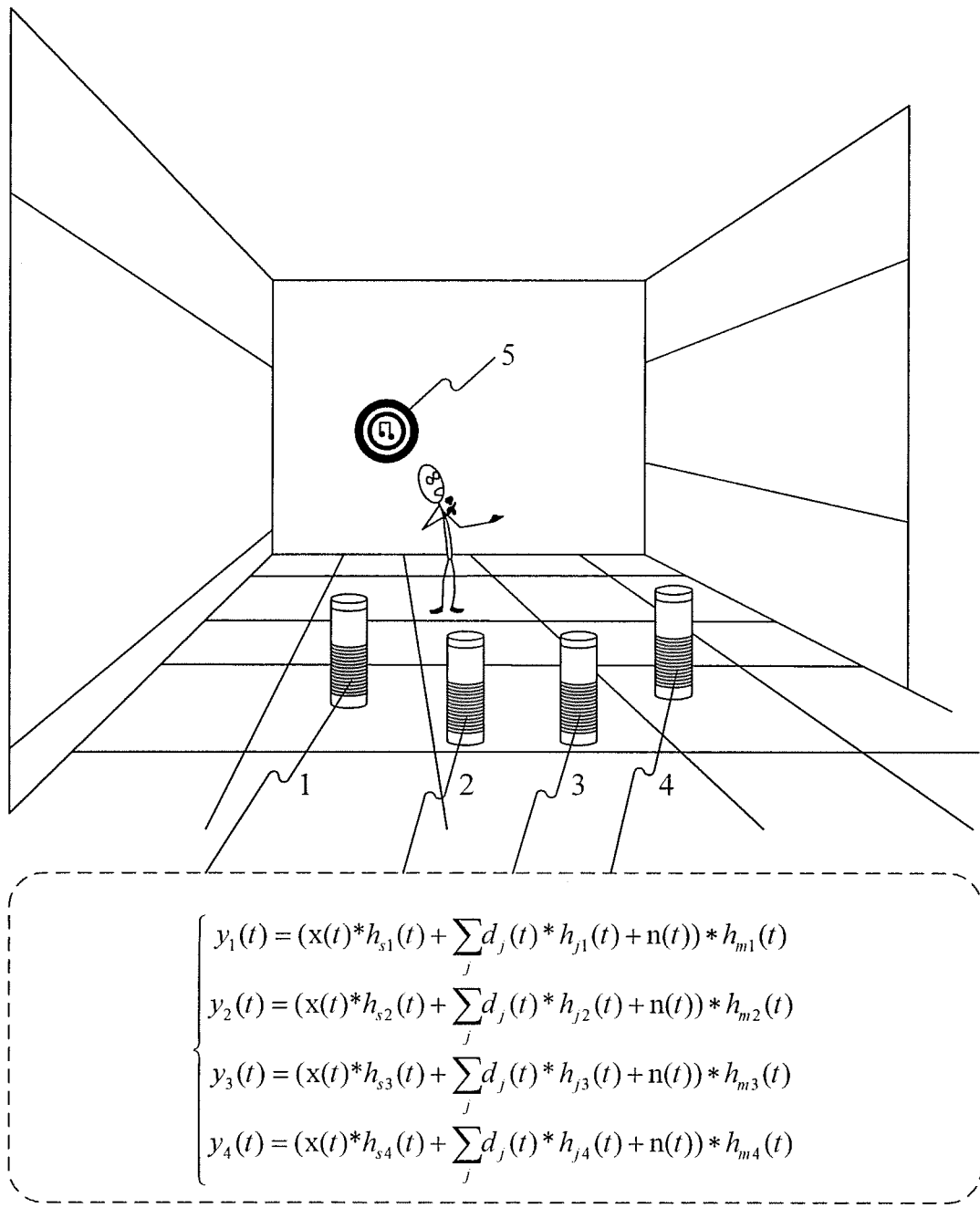
FIG. 1 is a schematic diagram showing an exemplary environment in which the audio recognition technologies is located, consistent with embodiments of the present disclosure.

The technical solutions in the embodiments of the present application will be described below clearly and completely with reference to the accompanying drawings in the embodiments of the present application. Apparently, the described embodiments are merely some, rather than all, of the embodiments of the present application. On the basis of the embodiments of the present application, all other embodiments obtainable by a person skilled in the art shall fall within the scope of the present disclosure.

As described above, in conventional systems, the process of model training for far field speech recognition uses near field speech data. In conventional systems, far-field audio data is typically simulated using near-field audio data, wherein near-field audio data can be picked up by an audio capturing device such as a microphone or a microphone array. In the process of simulating far-field audio data using near-field audio data, the impact response of ambient factors on the audio capturing device in the far-field audio environment can be obtained. The surrounding environmental factors generally considered in the conventional systems may include factors such as the size of the building space, the spatial location of the audio capturing device, and the like. Of course, it is also possible to take into account the directional background noise that affects the audio capturing device. In one example, for near-field speech data recorded by a single microphone, the far-field speech data can be simulated using the following expression (1):

$$y(t)=x(t)*h_s(t)+n(t) \qquad (1),$$

where $y(t)$ is the far-field speech data generated by the simulation, $x(t)$ is the near-field speech data, and $h_s(t)$ is the environmental factor such as the size of the building space and the position of the audio recording device. The resulting impulse response, n(t), is an isotropic background noise.

Through the calculation formula of far-field audio data shown in the above expression (1), it can be found that in the calculation process, only the impact of environmental factors such as the size of the building space, the position of the audio recording device, and the background noise on the recording device is considered. However, in the actual far-field speech environment, the environmental factors that can be generated for the recorded far-field audio data are far more than the factors embodied in the above formula (1). Therefore, the far-field audio data obtained by simulation similar to the above formula (1) often does not coincide with the actual far-field audio data.

The embodiments of the present disclosure address the issues with conventional systems. For example, the embodiments use far-field audio data with high robustness to perform far-field audio model training to obtain a far-field audio model with higher accuracy. The field audio model is of great significance for subsequent far-field audio recognition. Moreover, the embodiments of the present disclosure can also reduce the cost of acquiring the far-field audio data. The audio data processing method and apparatus provided by the present disclosure can acquire feature information of an enclosure having an audio capturing device (such as a microphone) and simulate far-field audio data by using near-field audio data recorded by the microphone based on the feature information. The embodiments can take into consideration the features of the enclosure as different enclosures can have different features resulting in different effects on the sound wave. Accordingly, the effect of the enclosure on the sound wave can be integrated into the process of simulating the far-field audio data by using near-field audio data. Thus, the far-field audio data obtained by using the near-field audio data simulation based on the feature information of the enclosure is closer to the actual far-field audio data.

FIG. 1 is a schematic diagram showing an exemplary environment in which the audio recognition devices are located, consistent with embodiments of the present disclosure. The embodiments of the present disclosure provide a voice data processing method, which can integrate a plurality of other environmental factors affecting a far-field audio environment into near-field audio data to simulate far-field audio data and to obtain more robust analog far-field audio data.

Specifically, one of the important environmental factors may include feature information of the enclosure in which the audio capturing device (e.g., microphone) is located. Of course, the audio data processing technology provided by the present application is not only applicable to a scenario in which far-field audio data is simulated by using audio data (such as voice data), but also applicable to any scenario involving audio processing such as voice recognition.

An example is described below through a specific application scenario. As shown in FIG. 1, in a room where audio data is recorded, audio capturing devices (e.g., a microphone array composed of four microphones) is disposed. After the audio data is recorded using the microphone array, the audio data can be simulated into far-field audio data in a manner as indicated by the dashed box in FIG. 1. As shown in FIG. 1, $y_1(t)$–$y_4(t)$ are the far-field audio data of audio capturing devices 1-4 generated by the simulation; x(t) is the recorded audio data; $h_{s1}(t)$–$h_{s4}(t)$ for the impulse response information for the background environment such as building characteristic information, microphone position, microphone layout, etc.; $h_{j1}(t)$–$h_{j4}(t)$ is the impulse response information caused by noise point source on the audio capturing devices 1-4; n(t) is isotropic noise; $h_{m1}(t)$–$h_{m4}(t)$ is the impulse response information of the enclosure where audio capturing devices 1-4 are located.

For the above room, the music generated by the music player 5 on the wall of the room can be determined as a noise point source, which, for example, can involve sounds spoken by other people in the room, and the like. In addition, the wind outside the room and the sound of the vehicles on the road are also part of the far-field audio data, which are far from the microphone array and produce almost the same effect. Therefore, these noises can be determined as isotropic noise. The above-mentioned noise point source and equal directional noise can be added not only in the real environment, but also in the sound simulation software, and no limitation is imposed here.

The impulse responses shown in the formulas of FIG. 1 can be obtained by means of testing or software simulation. In these embodiments, in consideration of the influence of the audio data of the enclosure, in the process of simulating far-field audio data by using the audio data (e.g., voice data mentioned above), the feature information of the enclosure may be reverberated to the audio data. Specifically, the feature information of the enclosure may include at least one of the following: a size, a shape, a material, and the like of the enclosure. The impulse response information $h_{m1}(t)$–$h_{m4}(t)$ can be obtained according to the actual environment test or the software simulation.

Figure 2:
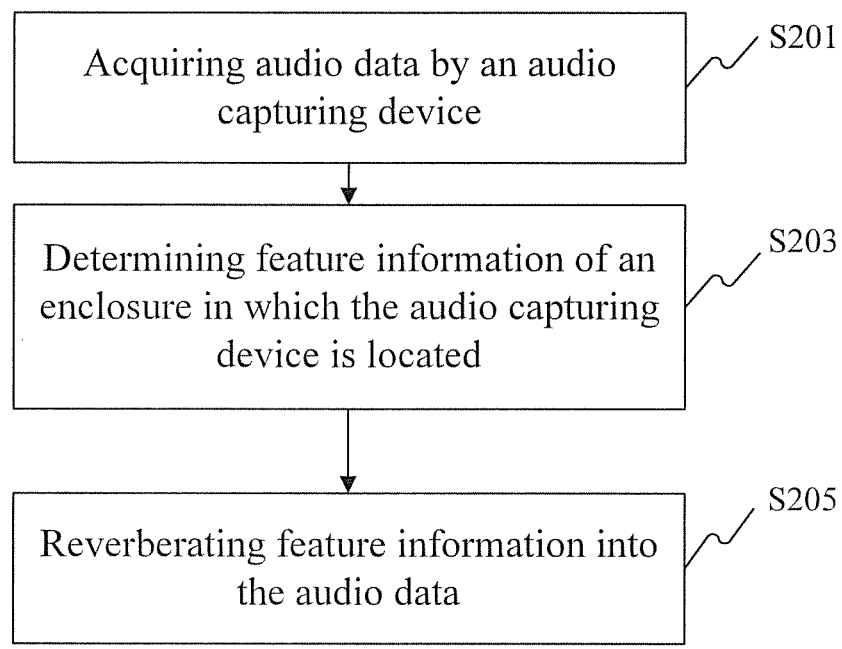
FIG. 2 is a flowchart illustrating an exemplary method for audio data processing, consistent with embodiments of the present disclosure.

FIG. 2 illustrates a flow diagram of an exemplary method for processing audio data, according to some embodiments of the disclosure. Referring FIG. 2, method 200 comprises steps S201, S203, and S205.

In step S201, audio data is acquired by an audio capturing device. In some embodiments, the audio data can include near field audio data. The near field audio data can include audio data recorded using an audio capturing device that is located close to an audio source. In general, if the distance between the audio capture device and the audio source is smaller than the wavelength of the audio, the audio data acquired by the audio capturing device qualifies as near field audio data. The audio data can include data recorded live or prerecorded data used for training.

In step S203, feature information of an enclosure in which the audio capturing device is located is determined. The audio capturing device can be placed inside an enclosure, such as a room. There are no limits as to where inside the enclosure the audio capturing device can be located. For example, the audio capturing device can be attached to the side of the enclosure or placed at the center of the enclosure. The enclosure can include a terminal's chassis or case. The terminal can include a laptop, a tablet, a smartphone, a digital assistant, a smart wearable device, a shopping terminal, a television, a smart stereo, etc. The smart wearable device can include a smart strap, a smart watch, smart glasses, a smart helmet, a smart bracelet, etc.

In step S205, the feature information is reverberated into the audio data. Since sound is a wave that can reflect and refract inside the enclosure, the audio capturing device can acquire sounds with different effects depending on where the audio capturing device is placed inside the enclosure. In a process of simulating far field audio data or obtaining audio data comprising noises from background environment, audio data can produce different effects in the enclosure. As a result, feature information of the enclosure can be reverberated into the audio data.

The feature information of the enclosure can comprise at least one of a size, a structure, or material of the enclosure.

For example, if the size of the enclosure becomes larger, the audio data acquired sounds deeper and thicker, and the impact of sound on the audio capturing device is more stable. If the size of the enclosure becomes smaller, the low-frequency portion of the audio is enhanced, the high-frequency portion of the audio is reduced, and the resonating portion of the audio is enhanced. Different materials used to build the enclosure can produce different effects on the audio. For example, a wooden enclosure produces better effect at the low-frequency portion of the audio compared to a plastic enclosure or a metal enclosure. In addition, the structure of the enclosure can affect the audio. For example, a cylinder-shaped enclosure has a better reverberation effect on the audio compared to a cuboid-shaped enclosure. The features of the enclosure affecting the audio is not limited to the examples above.

In some embodiments, audio data can be used to simulate far field audio data or to acquire audio data comprising noises of background environment based on some feature information of an enclosure in which the audio capturing device is located. For example, when simulating far field audio data, there can be two sound field models, namely a near field model and a far field model. The near field model can treat sound waves as spherical waves, and the far field model can treat sound waves as plane waves. The relationship between different sound signals can be approximated by latency in timing. Audio data can be used to produce far field audio data by performing spatial transmission and structural reflection on the audio data before the audio data reaches the audio capturing device. In some embodiments, reverberating the feature information of the enclosure into the audio data comprises performing a convolution process on an impulse response information caused by the enclosure and the audio data. The impulse response information of the audio capturing device caused by the enclosure can be determined by the feature information of the enclosure.

In some embodiments, the impulse response information of the audio capturing device caused by the enclosure can be obtained through a testing process. The testing process involves placing an audio capturing device inside an enclosure with some pre-defined feature information. When acquiring impulse response information, a testing audio signal is played and captured by the audio capturing device. Based on the testing audio signal and the signal captured by the audio capturing device, the impulse response information can be determined.

In some embodiments, the impulse response information of the audio capturing device caused by the enclosure can be obtained through a relationship between the feature information of the enclosure and impulse response information of the audio capturing device caused by the enclosure. Information on the relationship can be captured by setting a plurality of testing enclosures having different feature information and placing a testing audio capturing device in each testing enclosure. The impulse response information can be determined by testing the testing audio capturing devices. Having determined the impulse response information, a fitting process can be performed on the determined impulse response information to generate a mapping relationship between the feature information of the testing enclosures and the impulse response information of the testing audio capturing devices. For example, testing audio capturing devices can be placed in cylinder-shaped testing enclosures having different heights (e.g., 3 inch, 5 inch, 8 inch, 10 inch, etc.). The impulse response information can be determined through testing the testing audio capturing devices within the testing enclosures having different heights. The impulse response information can include band-pass filters. The band-pass filters can include parameters such as high-pass frequencies, low-pass frequencies, gains, etc. Based on the different sizes of the testing enclosure, the impulse response information on each testing audio capturing device is different. Having determined the impulse response information on all testing audio capturing devices, a fitting process can be performed on the determined impulse response information to generate a mapping relationship between the feature information of the testing enclosures and the impulse response information of the testing audio capturing devices.

In some embodiments, having determined the impulse response information, a convolution process can be performed on the audio data and the impulse response information to reverberate the feature information of the enclosure or enclosures into the audio data. For example, when simulating far field audio data, the far field audio data can be determined based on the following equation:

$$y(t)=x(t)*h_m(t) \qquad (2),$$

where y(t) is the simulated far field audio data, x(t) is the audio data, and $h_m(t)$ is the impulse response information caused by the enclosure.

In some embodiments, information from background environment outside the enclosure can also be reverberated into the audio data. The background environment contains at least one of the following: building feature information of a building where the audio capturing device is placed, positional information of a position of the audio capturing device, a noise point source around the audio capturing device, and isotropic noises. The building feature information can include a building's size and structure (e.g., stairway structure, cylindrical structure, etc.). The positional information can include a position of the audio capturing device inside a building. The noise point source around the audio capturing device can include a specific location of the noise point source, including human voices, music played at a specific location, etc. The isotropic noises can include spatial background noises, such as noises made by wind or on a public road. Having determined the background environment, impulse response information caused by the background environment can be determined. In some embodiments, the impulse response information caused by the background environment can be determined through testing. In some embodiments, the impulse response information caused by the background environment can be determined using software simulation and computation.

When simulating far field audio data, timing information can be used to determine effects on the audio capturing device caused by the background environment outside the enclosure, including impulse response information caused by the background environment. A convolution process can then be performed on the impulse response information caused by the background environment and the audio data to generate an initially processed audio data. Another convolution process can be performed on the initially processed audio data and the impulse response information caused by the enclosure to generate simulated far field audio data. For example, the far field audio data can be determined based on the following equation:

$$y(t) = \left(x(t)*h_s(t) + \sum_j d_j(t)*h_j(t) + n(t)\right)*h_m(t), \qquad (3)$$

where y(t) is the simulated far field audio data, x(t) is the audio data, $h_s(t)$ comprises impulse response information caused by the building feature information, positional information, etc. $d_j(t)$ is a noise point source, $h_j(t)$ is the impulse response information caused by the noise point source, n(t) is the isotropic noises, and $h_m(t)$ is the impulse response information caused by the enclosure.

In some embodiments, far field audio data can be simulated through audio data recorded using a matrix of audio capturing devices (e.g., microphone array). In a process of voice recognition, the matrix of audio capturing devices can perform noise suppression, echo suppression, reverberation inversion. The matrix of audio capturing devices can further locate audio sources, estimate the number of audio sources, and separate audio sources. For example, in the process of noise suppression, a filtering process can be performed on audio signals received by the audio capturing devices based on the timing difference of the audio signals. The filtering process can minimize the effect of background environment on the audio data. In some embodiments, audio capturing devices in the matrix are placed in separate enclosures. The feature information of each enclosure can be reverberated into the audio data. In some embodiments, a convolution process can be performed on the impulse response information and the audio data acquired by audio data acquired by audio capturing devices. The simulated far field audio data can be determined based on the following equations:

$$\begin{cases} y_1(t) = x(t) * h_{m1}(t) \\ y_2(t) = x(t) * h_{m2}(t) \\ y_3(t) = x(t) * h_{m3}(t) \\ y_4(t) = x(t) * h_{m4}(t) \end{cases} \quad (4)$$

where $y_1(t)$–$y_4(t)$ are simulated far field audio data for audio capturing devices 1-4, x(t) is the audio data, $h_{m1}(t)$–$h_{m4}(t)$ are impulse response information caused by one or more enclosures.

In some embodiments, information from background environment outside the enclosure can also be reverberated into the audio data. The background environment contains at least one of the following: building feature information of buildings where the audio capturing devices are placed, positional information of positions of the audio capturing devices, noise point source around the matrix of the audio capturing devices, and isotropic noises. The exact topology of the audio capturing devices in the matrix can also have some effect on the audio data. For example, the topology can be a linear shape, a ring shape, a sphere shape, etc. Different topologies produce different effects. In some embodiments, the simulated far field audio data in a matrix can be determined based on the following calculations:

$$\begin{cases} y_1(t) = \left(x(t) * h_{s1}(t) + \sum_j d_j(t) * h_{j1}(t) + n(t)\right) * h_{m1}(t) \\ y_2(t) = \left(x(t) * h_{s2}(t) + \sum_j d_j(t) * h_{j2}(t) + n(t)\right) * h_{m2}(t) \\ y_3(t) = \left(x(t) * h_{s3}(t) + \sum_j d_j(t) * h_{j3}(t) + n(t)\right) * h_{m3}(t) \\ y_4(t) = \left(x(t) * h_{s4}(t) + \sum_j d_j(t) * h_{j4}(t) + n(t)\right) * h_{m4}(t) \end{cases} \quad (5)$$

where $y_1(t)$–$y_4(t)$ are simulated far field audio data for audio capturing devices 1-4, x(t) is the audio data, $h_{s1}(t)$–$h_{s4}(t)$ are impulse response information caused by building feature information, positional information, etc. on audio capturing devices 1-4, $h_{j1}(t)$–$h_{j4}(t)$ are impulse response information caused by noise point sources on audio capturing devices 1-4, n(t) is the isotropic noises, and $h_{m1}(t)$–$h_{m4}(t)$ are impulse response information caused by one or more enclosures.

The methods for audio data processing disclosed in the embodiments of the present disclosure allow reverberating feature information of enclosures in which audio capturing devices are placed. Compared with the conventional systems, the method has the following advantages. First, conventional systems consider only the effects of building structures and isotropic noises on audio data. Conventional systems do not take consideration of effects of enclosures on sound transmission. Since enclosures having different features can have different effects to the sound wave, the methods of the present disclosure take into consideration the effects of enclosures on the sound waves. Second, the methods of the present disclosure can be used to simulate far field audio data. Compared with the conventional systems in simulating far field audio data, the method disclosed in the embodiments of the present disclosure can achieve a simulation closer to the far field audio data captured in the actual setting. This reduces the overall cost of capturing far field audio data and improves the accuracy of far field audio models in trainings of the far field audio models.

Figure 3:
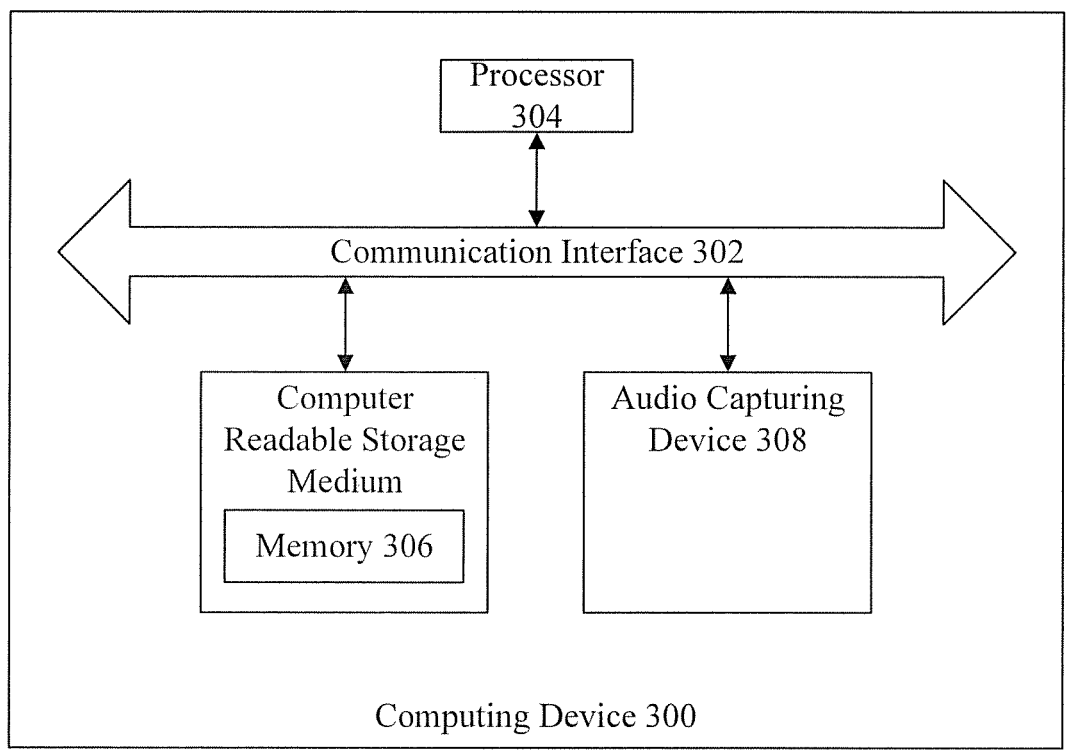
FIG. 3 is a block diagram illustrating an exemplary structure of device providing the audio data processing, consistent with embodiments of the present disclosure.

FIG. 3 illustrates a schematic diagram of a computing device 300 for processing audio data, according embodiments of the disclosure. Referring to FIG. 3, computing device 300 can include a communication interface 302, at least one processor 304, and a memory 306. In some embodiments, computing device 300 can include an audio capturing device 308 (such as one of audio capturing devices 1-4 of FIG. 1), although audio capturing device 308 can be remote from computing device 300.

Communication interface 302 can facilitate communications between the computing device 300 and other devices. In some embodiments, communication interface 302 is configured to support one or more communication standards, such as an Internet standard or protocol, an Integrated Services Digital Network (ISDN) standard, etc. In some embodiments, communication interface 302 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, communication interface 302 may be based on public cloud infrastructure, private cloud infrastructure, hybrid public/private cloud infrastructure.

Processor 304 may include one or more dedicated processing units, application-specific integrated circuits (ASICs), field-programmable gate arrays (FPGAs), or various other types of processors or processing units. Processor 304 is coupled with memory 306 and is configured to execute instructions stored in memory 306.

Memory 306 may be configured to store processor-executable instructions and data, such as method 200 of FIG. 2. Memory 306 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in memory 306 are executed by processor 304, computing device 300 may perform method 200 of FIG. 2.

For example, computing device 300 for processing audio data can include memory 306 for storing a set of instructions and processor 304 configured to execute the set of instructions to cause computing device 300 to perform: acquiring audio data by an audio capturing device, determining feature information of an enclosure of the audio capturing device, the audio capturing device being placed in the enclosure and reverberating the feature information into the audio data.

In some embodiments, processor 304 can be further configured to execute the set of instructions to cause computing device 300 to perform: determining, based on the feature information, first impulse response information of the audio capturing device caused by the enclosure and performing a convolution process on the first impulse response information and the audio data.

In some embodiments, processor 304 can be further configured to execute the set of instructions to cause the device to perform: acquiring second impulse response information caused by background environment, performing convolution process on the second impulse response information and the audio data to generate an initially-processed audio data and performing a convolution process on the first impulse response information and the initially-processed audio data.

The background environment can include at least one of a building where the audio capturing device is placed, the building having building feature information, a position of the audio capturing device, the position having positional information, a noise point source around the audio capturing device, or isotropic noises.

In some embodiments, processor 304 can be further configured to execute the set of instructions to cause computing device 300 to perform: setting a plurality of testing enclosures having different feature information, testing audio capturing devices being placed within the plurality of testing enclosures respectively, testing the testing audio capturing devices within the plurality of testing enclosures to determine impulse response information of each testing audio capturing device caused by a corresponding testing enclosure, performing a fitting process on the determined impulse response information of the testing audio capturing devices within the plurality of testing enclosures, to generate a mapping relationship between the feature information of the testing enclosures and the impulse response information of the testing audio capturing devices, and determining the first impulse response information of the audio capturing device based the feature information of the enclosure and the mapping relationship.

In another example, computing device 300 for processing audio data can include memory 306 for storing a set of instructions and processor 304 configured to execute the set of instructions to cause computing device 300 to perform: acquiring audio data recorded by an array of multiple microphones, acquiring feature information of microphone boxes where the microphones are placed and reverberating the feature information into the audio data.

In some embodiments, processor 304 can be further configured to execute the execute the set of instructions to cause computing device 300 to perform: determining, based on the feature information, impulse response information of the microphones caused by the microphone boxes and performing convolution process on the impulse response information and the audio data.

In some embodiments, processor 304 can be further configured to execute the set of instructions to cause computing device 300 to perform: acquiring impulse response information caused by background environment other than the microphone boxes respectively, performing convolution process on the impulse response information and the audio data to generate an initial processed audio data respectively and performing convolution process on the impulse response information of the microphones caused by the microphone boxes and the initial processed audio data, respectively.

In some embodiments, the background environment can include at least one of: feature information of a building where the microphones are placed, positional information of the microphones, a layout of the array of the microphones, noise point sources around the microphones, or isotropic noises.

Each of the above described modules or components may be implemented as software, hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

In some embodiments, a computer program product may include a non-transitory computer-readable storage medium having computer-readable program instructions thereon for causing a processor to carry out the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computer-readable storage medium can be a tangible device that can store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and procedural programming languages. The computer readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A method for processing audio data, comprising:
acquiring audio data by an audio capturing device;
determining feature information of an enclosure in which the audio capturing device is located; and
reverberating the feature information into the audio data, wherein reverberating the feature information into the audio data comprises:
setting a plurality of testing enclosures having different feature information, testing audio capturing devices being placed within the plurality of testing enclosures respectively, wherein the feature information of the testing enclosures is different from the feature information of the enclosure;
testing the testing audio capturing devices within the plurality of testing enclosures to determine impulse response information of each testing audio capturing device caused by a corresponding testing enclosure;
performing a fitting process on the determined impulse response information of the testing audio capturing devices within the plurality of testing enclosures, to generate a mapping relationship between the feature information of the testing enclosures and the impulse response information of the testing audio capturing devices caused by the testing enclosures;
determining first impulse response information of the audio capturing device caused by the enclosure based on the feature information of the enclosure and the mapping relationship;
acquiring second impulse response information caused by background environment;
performing convolution process on the second impulse response information caused by the background environment and the audio data to generate an initially-processed audio data; and
performing convolution process on the first impulse response information of the audio capturing device caused by the enclosure and the initially processed audio data.

2. The method of claim 1, wherein reverberating the feature information into the audio data further comprises:
performing a convolution process on the first impulse response information and the audio data.

3. The method of claim 1, wherein the background environment comprises at least one of:
a building where the audio capturing device is placed, the building having building feature information;
a position of the audio capturing device, the position having positional information;
a noise point source around the audio capturing device; or
isotropic noises.

4. The method of claim 1, wherein the feature information of the enclosure comprises at least one of a size, a structure, or material of the enclosure.

5. The method of claim 2, wherein determining the first impulse response information of the audio capturing device caused by the enclosure based the feature information of the enclosure and the mapping relationship further comprises:
receiving test information using a test audio capturing device, the test audio capturing device being placed in the enclosure having the feature information; and
determining the first impulse response information based on the test information.

6. A non-transitory computer-readable medium having stored therein a set of instructions that, when executed by at least one processor of a computer system, causes the computer system to perform a method for processing audio data, the method comprising:
acquiring audio data by an audio capturing device;

determining feature information of an enclosure in which the audio capturing device is located; and reverberating the feature information into the audio data, wherein reverberating the feature information into the audio data comprises:

setting a plurality of testing enclosures having different feature information, testing audio capturing devices being placed within the plurality of testing enclosures respectively, wherein the feature information of the testing enclosures is different from the feature information of the enclosure;

testing the testing audio capturing devices within the plurality of testing enclosures to determine impulse response information of each testing audio capturing device caused by a corresponding testing enclosure;

performing a fitting process on the determined impulse response information of the testing audio capturing devices within the plurality of testing enclosures, to generate a mapping relationship between the feature information of the testing enclosures and the impulse response information of the testing audio capturing devices caused by the testing enclosures;

determining first impulse response information of the audio capturing device caused by the enclosure based on the feature information of the enclosure and the mapping relationship;

acquiring second impulse response information caused by background environment;

performing convolution process on the second impulse response information caused by the background environment and the audio data to generate an initially-processed audio data; and performing convolution process on the first impulse response information of the audio capturing device caused by the enclosure and the initially processed audio data.

7. The non-transitory computer-readable medium of claim 6, wherein reverberating the feature information into the audio data further comprises:

performing a convolution process on the first impulse response information and the audio data.

8. The non-transitory computer-readable medium of claim 6, wherein the background environment comprises at least one of:

a building where the audio capturing device is placed, the building having building feature information;

a position of the audio capturing device, the position having positional information;

a noise point source around the audio capturing device; or isotropic noises.

9. The non-transitory computer-readable medium of claim 6, wherein the feature information of the enclosure comprises at least one of a size, a structure, or material of the enclosure.

10. The non-transitory computer-readable medium of claim 7, wherein determining the first impulse response information of the audio capturing device caused by the enclosure based the feature information of the enclosure and the mapping relationship further comprises:

receiving test information using a test audio capturing device, the test audio capturing device being placed in an enclosure having the feature information; and determining the first impulse response information based on the test information.

11. A device for processing audio data, comprising:

a memory for storing a set of instructions; and at least one processor configured to execute the set of instructions to cause the device to perform:

acquiring audio data by an audio capturing device;

determining feature information of an enclosure in which the audio capturing device is located; and reverberating the feature information into the audio data, wherein reverberating the feature information into the audio data comprises:

setting a plurality of testing enclosures having different feature information, testing audio capturing devices being placed within the plurality of testing enclosures respectively, wherein the feature information of the testing enclosures is different from the feature information of the enclosure;

testing the testing audio capturing devices within the plurality of testing enclosures to determine impulse response information of each testing audio capturing device caused by a corresponding testing enclosure;

performing a fitting process on the determined impulse response information of the testing audio capturing devices within the plurality of testing enclosures, to generate a mapping relationship between the feature information of the testing enclosures and the impulse response information of the testing audio capturing devices caused by the testing enclosures;

determining first impulse response information of the audio capturing device caused by the enclosure based on the feature information of the enclosure and the mapping relationship;

acquiring second impulse response information caused by background environment;

performing convolution process on the second impulse response information caused by the background environment and the audio data to generate an initially-processed audio data; and performing convolution process on the first impulse response information of the audio capturing device caused by the enclosure and the initially processed audio data.

12. The device of claim 11, wherein in reverberating the feature information into the audio data, the at least one processor is further configured to execute the set of instructions to cause the device to perform:

performing a convolution process on the first impulse response information and the audio data.

13. The device of claim 11, wherein the background environment comprises at least one of:

a building where the audio capturing device is placed, the building having building feature information;

a position of the audio capturing device, the position having positional information;

a noise point source around the audio capturing device; or isotropic noises.

14. The device of claim 11, wherein the feature information of the enclosure comprises at least one of a size, a structure, or material of the enclosure.

* * * * *